United States Patent
Harari et al.

(10) Patent No.: US 7,305,535 B2
(45) Date of Patent: Dec. 4, 2007

(54) MEMORY CARDS INCLUDING A STANDARD SECURITY FUNCTION

(75) Inventors: Eliyahou Harari, Los Gatos, CA (US); Yoram Cedar, Cupertino, CA (US); Wesley G. Brewer, Los Gatos, CA (US); Yosi Pinto, Kfar-Vradim (IL); Reuven Elhamias, Kfar-Vradim (IL); Micky Holtzman, Kfar-Vradim (IL)

(73) Assignee: SanDisk Corporation, Milpitas, CA (US)

( * ) Notice: Subject to any disclaimer, the term of this patent is extended or adjusted under 35 U.S.C. 154(b) by 395 days.

(21) Appl. No.: 10/418,910

(22) Filed: Apr. 17, 2003

(65) Prior Publication Data

US 2004/0210715 A1    Oct. 21, 2004

(51) Int. Cl.
*G06F 12/14* (2006.01)
(52) U.S. Cl. .................................. 711/164
(58) Field of Classification Search ............ 711/115, 711/163, 164
See application file for complete search history.

(56) References Cited

U.S. PATENT DOCUMENTS

| | | | |
|---|---|---|---|
| 4,455,620 A | 6/1984 | Watanabe et al. |
| 4,458,313 A | 7/1984 | Suzuki et al. |
| 4,614,144 A | 9/1986 | Sagara et al. |
| 4,882,473 A | 11/1989 | Bergeron et al. |
| 4,882,476 A | 11/1989 | White |
| 5,067,075 A | 11/1991 | Sugano et al. |
| 5,155,663 A | 10/1992 | Harase |
| 5,375,037 A | 12/1994 | Le Roux |
| 5,375,084 A | 12/1994 | Begun et al. |
| 5,434,872 A | 7/1995 | Petersen et al. |
| 5,438,359 A | 8/1995 | Aoki |
| 5,457,601 A | 10/1995 | Georgopulos et al. |
| 5,486,687 A | 1/1996 | Le Roux |
| 5,513,074 A | 4/1996 | Ainsbury et al. |
| 5,563,400 A | 10/1996 | Le Roux |
| 5,606,559 A | 2/1997 | Badger et al. |
| 5,655,917 A | 8/1997 | Kaneshige et al. |

(Continued)

FOREIGN PATENT DOCUMENTS

DE    4416583    7/1995

(Continued)

OTHER PUBLICATIONS

PCT/International Bureau, International Preliminary Exam Report, PCT/US2004/007782 mailed Nov. 3, 2005, 11 pages.

(Continued)

*Primary Examiner*—Kevin L. Ellis
(74) *Attorney, Agent, or Firm*—Davis Wright Tremaine LLP

(57) ABSTRACT

A memory card of one published standard, such as the Multi-Media Card (MMC) or Secure Digital Card (SD), is modified to include the function of a Subscriber Identity Module (SIM) according to another published standard. The controller of the memory card communicates between electrical contacts on the outside of the card and both the memory and the SIM. In one specific form, the memory card has the physical configuration of the current Plug-in SIM card with a few external contacts added to accommodate the memory controller and data memory. In another specific form, the memory card has the physical configuration of the current SD card, including external contacts.

22 Claims, 7 Drawing Sheets

U.S. PATENT DOCUMENTS

| | | | |
|---|---|---|---|
| 5,677,524 | A | 10/1997 | Haghiri-Tehrani |
| 5,727,168 | A | 3/1998 | Inoue et al. |
| 5,733,800 | A | 3/1998 | Moden |
| 5,742,910 | A | 4/1998 | Gallant et al. |
| 5,752,857 | A | 5/1998 | Knights |
| 5,764,896 | A | 6/1998 | Johnson |
| 5,778,195 | A | 7/1998 | Gochi |
| 5,780,837 | A | 7/1998 | Garcia |
| 5,780,925 | A | 7/1998 | Cipolla et al. |
| 5,784,633 | A | 7/1998 | Petty |
| 5,802,325 | A | 9/1998 | Le Roux |
| 5,809,520 | A | 9/1998 | Edwards et al. |
| 5,822,190 | A | 10/1998 | Iwasaki |
| 5,831,256 | A | 11/1998 | De Larminat et al. |
| 5,831,533 | A | 11/1998 | Kanno |
| 5,837,984 | A | 11/1998 | Bleier et al. |
| 5,852,290 | A | 12/1998 | Chaney |
| 5,877,488 | A | 3/1999 | Klatt et al. |
| 5,887,145 | A | 3/1999 | Harari et al. |
| 5,909,596 | A | 6/1999 | Mizuta |
| 5,928,347 | A | 7/1999 | Jones |
| 5,933,328 | A | 8/1999 | Wallace et al. |
| 5,974,496 | A | 10/1999 | Miller |
| 5,975,584 | A | 11/1999 | Vogt |
| 5,987,557 | A | 11/1999 | Ebrahim |
| 6,040,622 | A | 3/2000 | Wallace |
| 6,062,480 | A | 5/2000 | Evoy |
| 6,062,887 | A | 5/2000 | Schuster et al. |
| 6,069,795 | A | 5/2000 | Klatt et al. |
| 6,075,706 | A | 6/2000 | Learmonth et al. |
| 6,097,605 | A | 8/2000 | Klatt et al. |
| 6,125,409 | A | 9/2000 | Le Roux |
| 6,137,710 | A | 10/2000 | Iwasaki et al. |
| 6,140,695 | A | 10/2000 | Tandy |
| 6,145,046 | A | 11/2000 | Jones |
| 6,151,511 | A | 11/2000 | Cruciani |
| 6,151,652 | A | 11/2000 | Kondo et al. |
| 6,175,517 | B1 | 1/2001 | Jigour et al. |
| 6,199,756 | B1 | 3/2001 | Kondo et al. |
| 6,202,109 | B1 | 3/2001 | Salo et al. |
| 6,226,201 | B1 | 5/2001 | Kikuchi |
| 6,240,301 | B1 | 5/2001 | Phillips |
| 6,244,894 | B1 | 6/2001 | Miyashita |
| 6,182,204 | B1 | 7/2001 | Nakashima |
| 6,266,724 | B1 | 7/2001 | Harari et al. |
| 6,279,114 | B1 | 8/2001 | Toombs et al. |
| 6,311,296 | B1 | 10/2001 | Congdon |
| 6,353,870 | B1 | 3/2002 | Mills et al. |
| 6,381,662 | B1 | 4/2002 | Harari et al. |
| 6,385,677 | B1 | 5/2002 | Yao |
| 6,405,278 | B1 | 6/2002 | Liepe |
| 6,421,246 | B1 | 7/2002 | Schremmer |
| 6,434,648 | B1 | 8/2002 | Assour et al. |
| 6,438,638 | B1 | 8/2002 | Jones et al. |
| 6,446,177 | B1 | 9/2002 | Tanaka et al. |
| 6,457,647 | B1 | 10/2002 | Kurihashi et al. |
| 6,496,381 | B1 | 12/2002 | Groeger |
| 6,499,016 | B1 | 12/2002 | Anderson |
| 6,524,137 | B1 | 2/2003 | Liu et al. |
| 6,612,498 | B1 | 9/2003 | Lipponen et al. |
| 6,651,131 | B1 | 11/2003 | Chong, Jr. et al. |
| 6,665,190 | B2 | 12/2003 | Clayton et al. |
| 6,669,487 | B1 | 12/2003 | Nishizawa et al. |
| 6,687,778 | B2 | 2/2004 | Ito et al. |
| 6,748,457 | B2 | 6/2004 | Fallon et al. |
| 6,764,017 | B2 | 7/2004 | Chen et al. |
| 6,816,933 | B1 | 11/2004 | Andreas |
| 6,832,281 | B2 | 12/2004 | Jones et al. |
| 6,842,818 | B2 | 1/2005 | Okamoto et al. |
| 6,845,421 | B2 | 1/2005 | Hwang et al. |
| 6,862,604 | B1 | 3/2005 | Spencer et al. |
| 6,886,083 | B2 | 4/2005 | Murakami |
| 6,945,461 | B1 | 9/2005 | Hien et al. |
| 2001/0001507 | A1 | 5/2001 | Fukuda et al. |
| 2001/0021956 | A1 | 9/2001 | Okamoto et al. |
| 2001/0042149 | A1 | 11/2001 | Ito et al. |
| 2002/0103988 | A1 | 8/2002 | Dornier |
| 2003/0056050 | A1 | 3/2003 | Moro |
| 2003/0074529 | A1 | 4/2003 | Crohas |
| 2003/0084221 | A1 | 5/2003 | Jones et al. |
| 2003/0163623 | A1 | 8/2003 | Yeung |
| 2004/0103234 | A1 | 5/2004 | Zer et al. |
| 2005/0107987 | A1 | 5/2005 | Barr et al. |

FOREIGN PATENT DOCUMENTS

| | | | |
|---|---|---|---|
| DE | 4416583 | | 12/1995 |
| DE | 198 55 596 | A | 6/2000 |
| EP | 495216 | A2 | 7/1992 |
| EP | 495216 | A3 | 7/1992 |
| EP | 0657834 | A1 | 6/1995 |
| EP | 0891047 | A2 | 1/1999 |
| EP | 1001348 | A2 | 5/2000 |
| EP | 1037159 | A2 | 9/2000 |
| EP | 1074906 | A1 | 2/2001 |
| EP | 1085516 | A2 | 3/2001 |
| EP | 1 27 8154 | A1 | 1/2003 |
| FR | 2771199 | | 5/1999 |
| FR | 2771199 | A | 5/1999 |
| GB | 2374204 | A | 9/2002 |
| JP | 60-234286 | | 11/1985 |
| JP | 3-195052 | | 8/1991 |
| JP | 5-89304 | | 4/1993 |
| JP | 6103429 | | 4/1994 |
| JP | 6-223241 | | 8/1994 |
| JP | 6231318 | | 8/1994 |
| JP | 7094658 | | 4/1995 |
| JP | 2001-307801 | | 11/2001 |
| JP | 2001282712 | | 12/2001 |
| JP | 2002245428 | | 8/2002 |
| JP | 2003196624 | | 7/2003 |
| NL | 9301540 | | 4/1995 |
| WO | WO 00/70553 | | 11/2000 |
| WO | WO 00/70554 | | 11/2000 |
| WO | WO 01/84490 | A1 | 11/2001 |
| WO | WO 02/13021 | A2 | 2/2002 |
| WO | WO 02/15020 | A2 | 2/2002 |
| WO | WO 02/19266 | A | 3/2002 |
| WO | WO2004/044755 | A2 | 5/2004 |
| WO | WO 2004/049177 | A2 | 6/2004 |
| WO | WO 2004/095365 | A1 | 11/2004 |

OTHER PUBLICATIONS

U.S. Office Action for U.S. Appl. No. 11/303,220, mailed Mar. 10, 2006, 19 pages.

Taiwanese Patent Office, "Preliminary Notice Of Rejection From IPO", issued in Taiwan Patent Application No.: 093139258, mailed Feb. 16, 2006, 2 pages.

European Office Action, 04 719 867.6, mailed Mar. 9, 2006, 3 pages.

European Office Action, 03 783 177.3, mailed Sep. 14, 2005, 4 pages.

Official Notification of the IPO, 093138176, mailed Oct. 5, 2005, 3 pages.

U.S. Office Action for U.S. Appl. No. 10/741,147, mailed Nov. 23, 2005, 25 pages.

U.S. Office Action for U.S. Appl. No. 10/293,985, mailed Jan. 9, 2006, 15 pages.

U.S. Office Action for U.S. Appl. No. 11/075,438 (SNDK.275US1) mailed Jan. 24, 2006, 9 pages.

PCT/International Bureau, International Preliminary Exam Report, dated Mar. 11, 2004, 11 pages. (same as Written Opinion that was part of the ISR—SNDK.259WO0).

U.S. office Action for U.S. Appl. No. 10/732,149 (SNDK.311US0) mailed Feb. 14, 2006, 32 pages.

Wilson, James Y. and Kronz, Jason A., "Inside Bluetooth—Part 1," *Dr. Dobb's Journal*, pp. 62-70, Mar. 2000.

Wilson, James Y. and Kronz, Jason A., "Inside Bluetooth—Part 2," *Dr. Dobb's Journal*, pp. 58-64, Apr. 2000.

SanDisk Corporation , "SanDisk MultiMediaCard Product Manual ©", Rev. 2, Apr. 2000, pp. 2-86.

U.S. Office Action for U.S. Appl. No. 10/302,009, mailed Sep. 6, 2005, 17 pages.

MultiMediaCard System Specification Version 2.2 Official Release © Jan. 2000 MMCA Technical Committee, pp. 2-123.

MultiMediaCard System Specification Version 2.11 Official Release © Jun. 1999 MMCA Technical Committee, pp. 2-123.

Taiwanese Patent Office, "Final Office Action Prior to Rejection", issued in Taiwan Patent Application No. 90121510, received by facsimile Jun. 23, 2005, 2 pages.

International Search Report and Written Opinion issued in PCT/US2004/040952, mailed Apr. 29, 2005, 11 pages.

International Search Report issued in PCT/US03/40042, mailed Feb. 11, 2004, 7 pages.

"Palm Brand Products to Feature Secure Digital (SD) Card Slot for Expansion", SD Card Association—Press Room, www.sdcard.org/press7.htm, dated Jun. 27, 2000, 4 pages.

International Search Report issued in PCT/US01/27362, mailed Feb. 25, 2002, 3 pages.

Chinese Patent Office, Notification of the First Office Action, mailed Apr. 16, 2004 in Chinese application No. 01815704.1, 10 pages, including translation.

International Search Report issued in PCT/US2004/040122 mailed Apr. 1, 2005, 3 pages.

EPO/ISA Written Opinion issued in PCT/US2004/040122 mailed Apr. 1, 2005, 5 pages.

"Palm Brand Products to Feature Secure Digital (SD) Card Slot for Expansion", SD Card Association—Press Room, dated Jun. 27, 2000, 4 pages.

SD Group, "Simplified Version of: Part 1 Physical Layer Specification", Version 1.01, Apr. 15, 2001, 32 pages.

ISA/EPO, "International Search Report", mailed in related PCT/US03/35325, mailed Oct. 13, 2004, 9 pages.

"Olympus Camedia: Accessories at a Glance", http://www.bicos.de/media/Olympus-Zubeh%F6r.pdf, retrieved May 6, 2004, 18 pages.

EPO/ISA, "Partial International Search Report", mailed on Jul. 2, 2004 in related PCT/US03/35325, 6 pages.

EPO/ISA, "International Search Report and Written Opinion", mailed Oct. 13, 2004 in corresponding PCT/US2004/007782, 15 pages.

"Partial International Search Report", EPO International Searching Authority, mailed Aug. 10, 2004 in corresponding PCT Application No. PCT/US2004/007782, 4 pages.

"CF+ and CompactFlash Specification, Revision 1.4", CompactFlash Association, Jul. 1999, pp. 1-105.

"The MultiMedia Card System Specification, Version 3.1", MMCA Technical Committee, MultiMediaCard Association, Jun. 2001, pp. 1-130.

"Digital Cellular Telecommunications System (Phase 2+); Specification of the Subscriber Identity Module—Mobile Equipment (SIM—ME) Interface", Global System for Mobile Communications (GSM®), Technical Specification ETSI TS 100 977 V8.3.0 (2000-08), GSM 11.11 Version 8.3.0, 1999, pp. 1-170.

"MultiMedia Card Product Manual, Revision 2", SanDisk Corporation, Jun. 2001, pp. 1-86.

"Identification cards—Physical Characteristics", ISO/IEC 7810 International Standard, 1995, pp. 1-5.

"Identification Cards—Integrated Circuit(s) Cards With Contacts, Part 10: Electronic Signals and Answer to Reset for Synchronous Cards", ISO/IEC 7816-10 International Standard, 1999, pp. 1-7.

"Information Technology—Identification Cards—Integrated Circuit(s) Cards With Contacts, Part 3: Electronic Signals and Transmission Protocols", ISO/IEC 7816-3 International Standard, 1997, pp. 1-27.

"Information Technology—Identification Cards—Integrated Circuit(s) Cards With Contacts, Part 2: Dimensions and Location of the Contacts", ISO/IEC 7816-2 International Standard, 1999, pp. 1-5.

Identification Cards—Integrated Circuit(s) Cards With Contacts, Part 1: Physical Characteristics, ISO/IEC 7816-1 International Standard, 1998, pp. 1-3.

European Patent Office, Revised Report, mailed on Aug. 17, 2006 in corresponding European Patent Application No. 04 719 867.6 (publication No. EP 1614063 / WO 2004/095365 A1), 1 page.

Search Report mailed in related European Patent Application No. 05 077 847.1 on Oct. 15, 2006, 5 pages.

Communication Pursuant to Article 96(2) EPC for Application No. 050778471. for San Disk Corporation mailed May 23, 2007, 1 page.

Communication Pursuant to Article 96(2) EPC for Application No. 04 719 867.6. for SanDisk Corporation mailed Jul. 13, 2007, 4 pages.

First Office Action for Chinese Application No. 200480014148.5 for San Disk Corporation mailed Jun. 13, 2007, 15 pages.

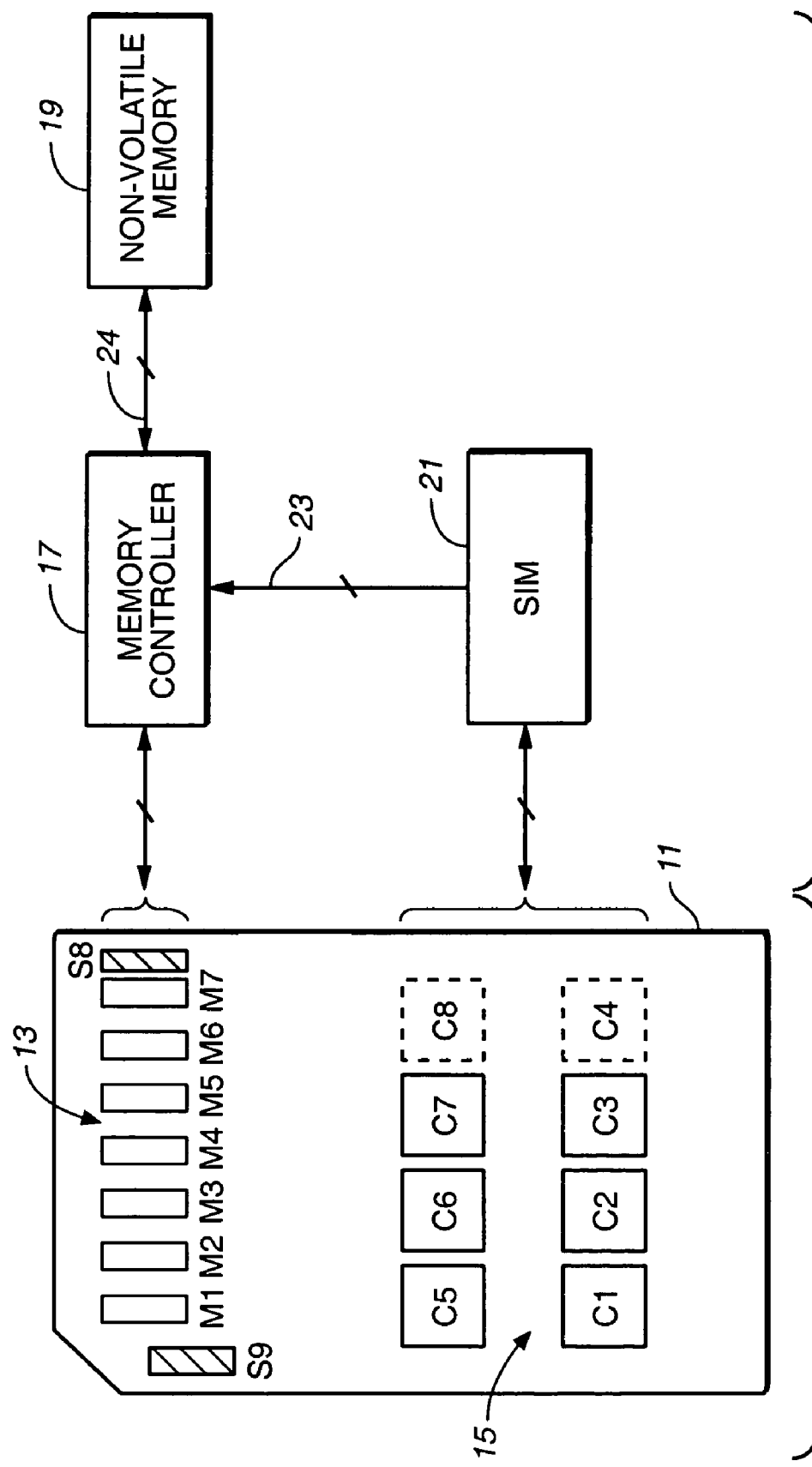

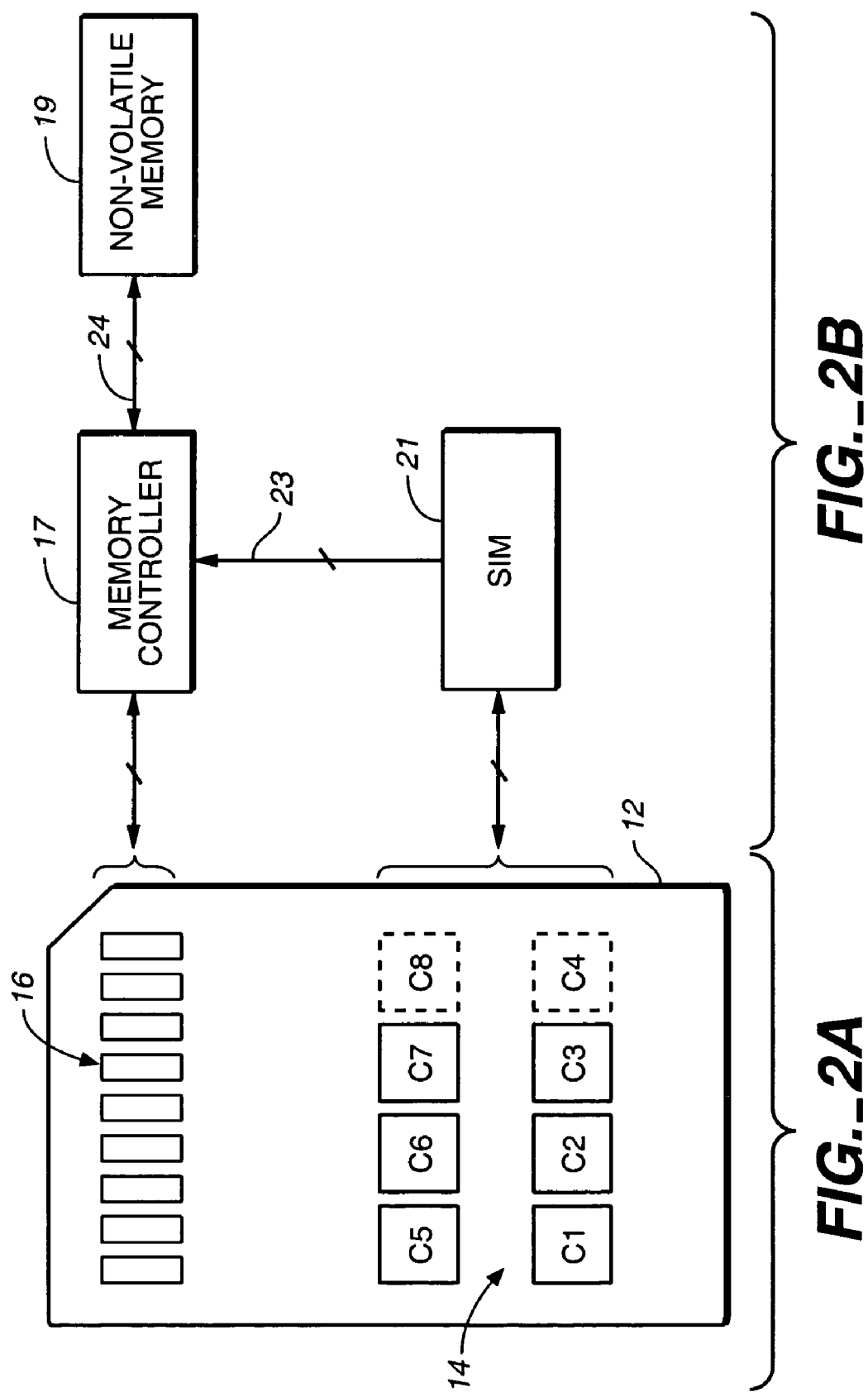

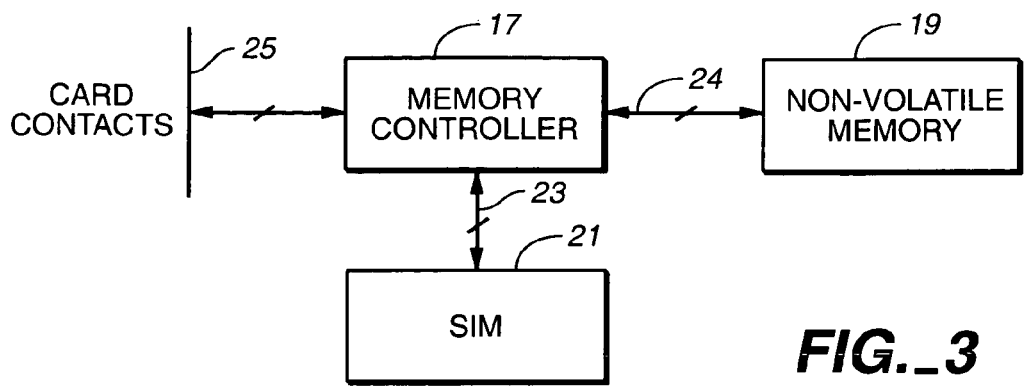
FIG._3
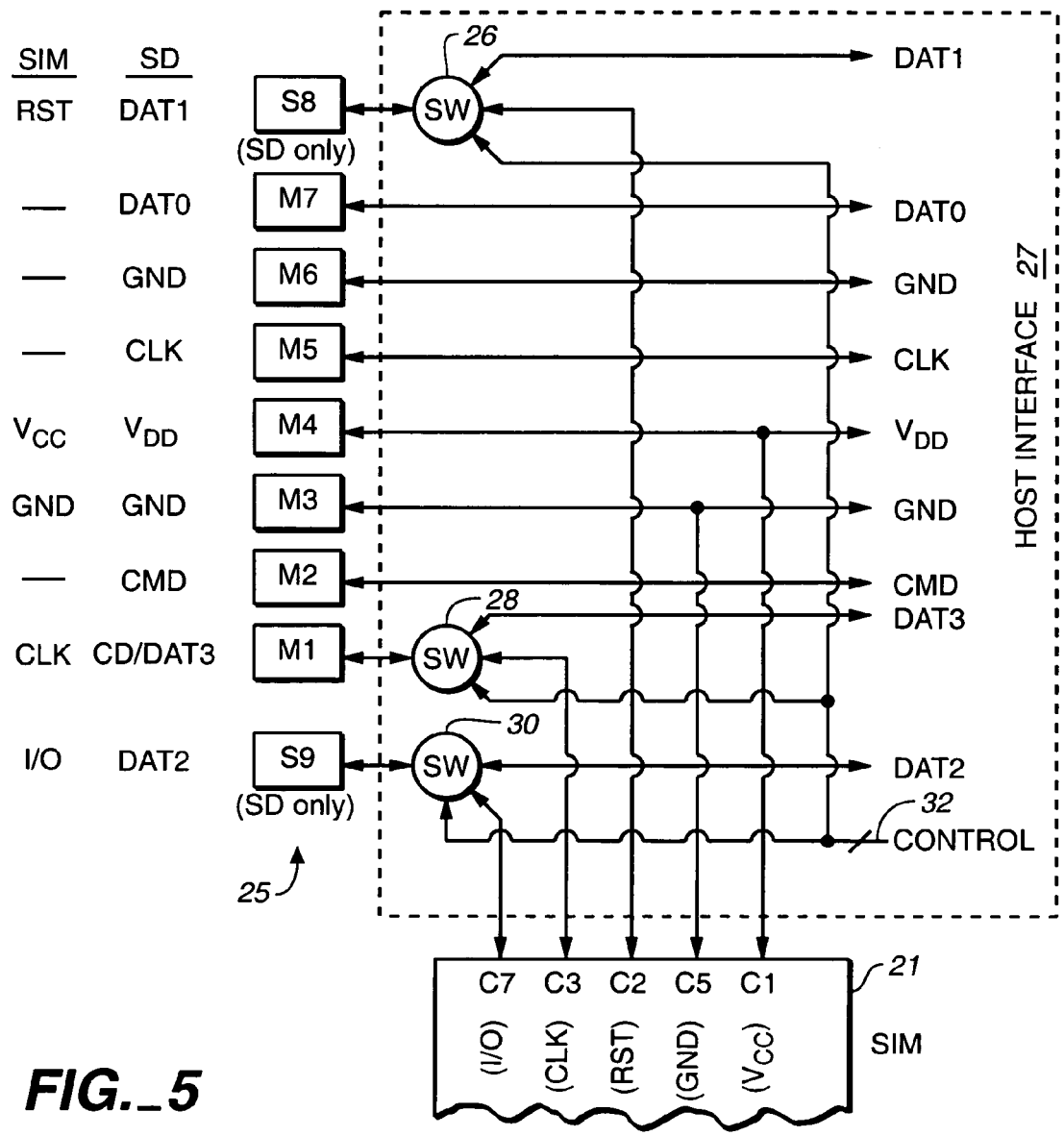
FIG._5

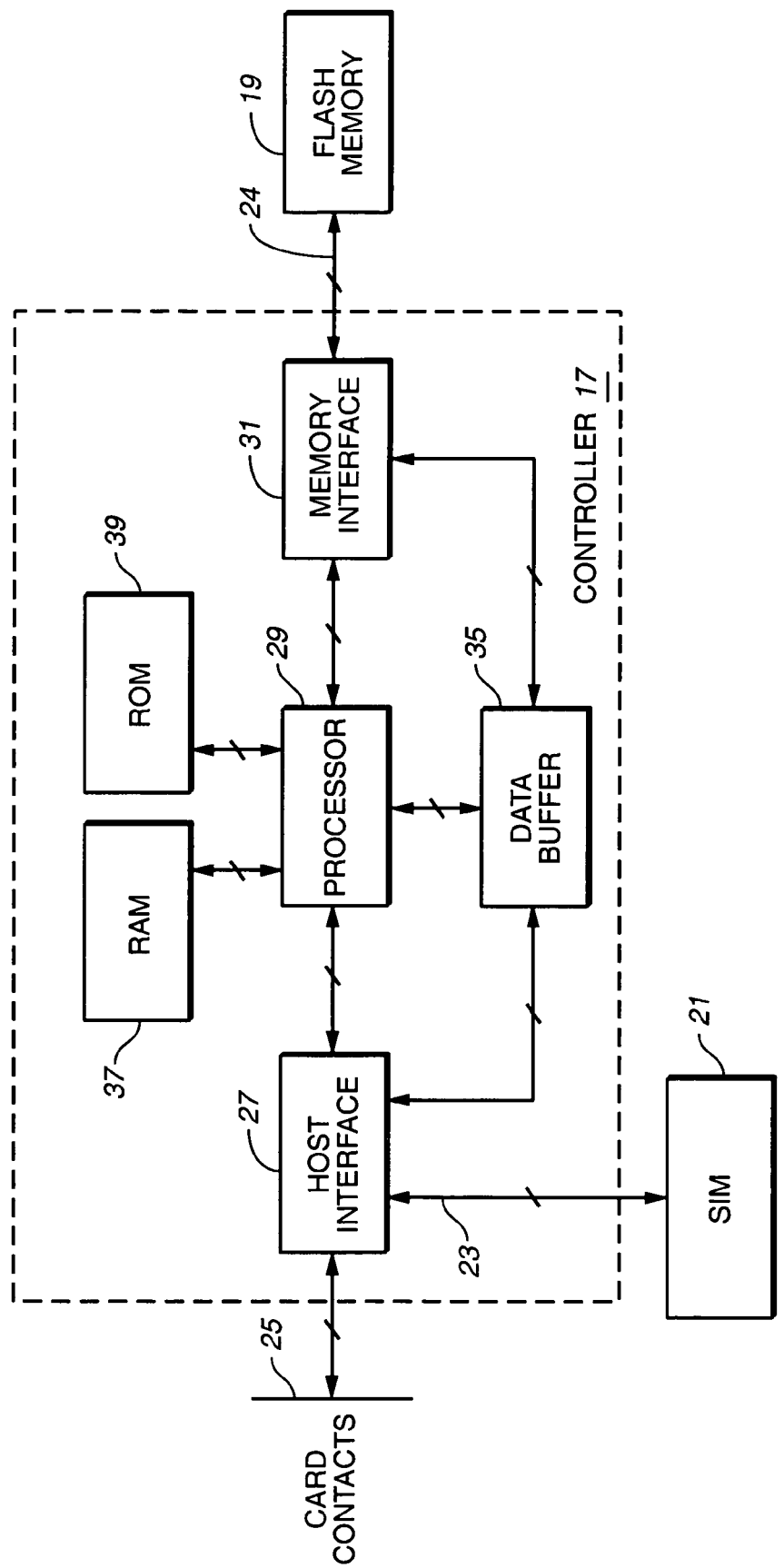
FIG._4

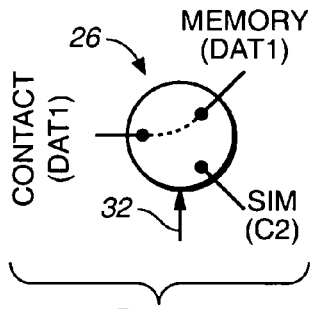
*FIG._6A*
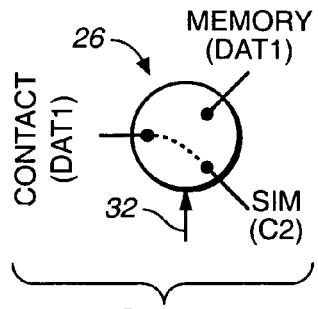
*FIG._6B*
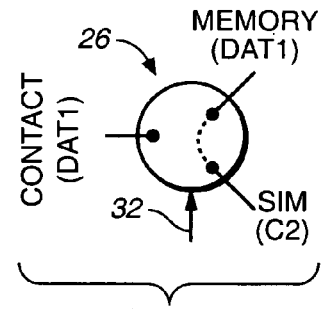
*FIG._6C*
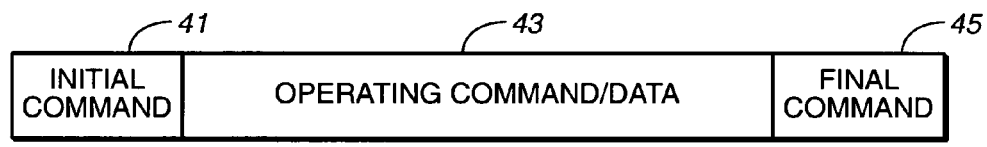
*FIG._7*
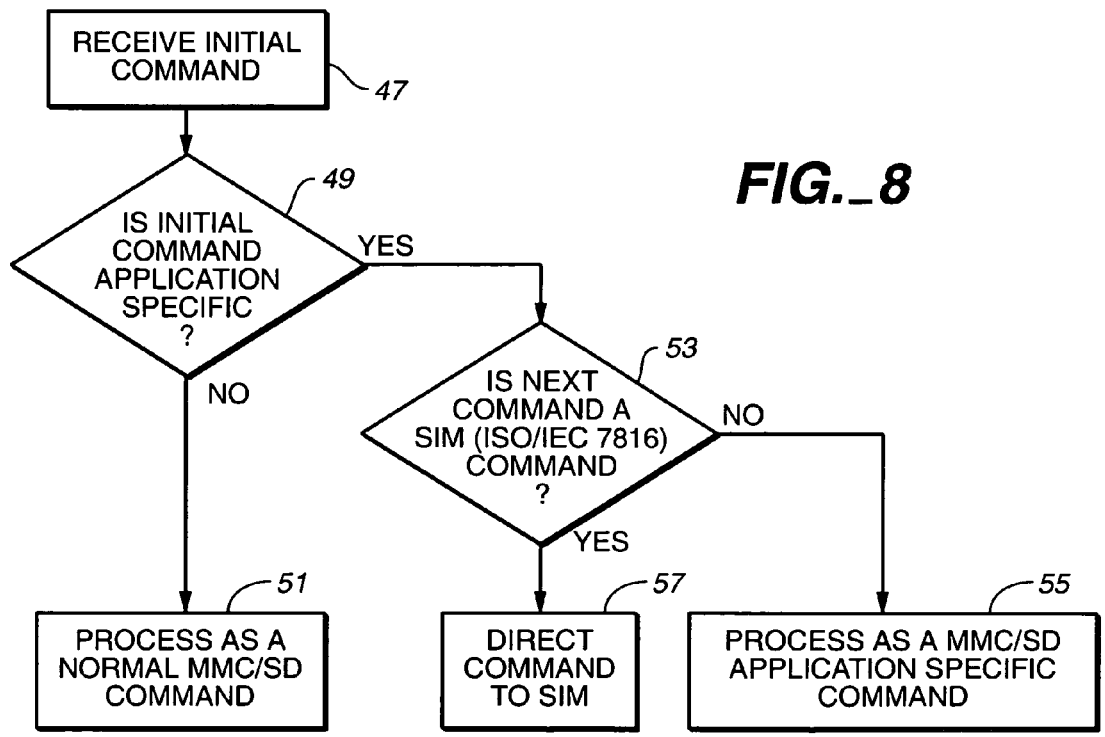
*FIG._8*

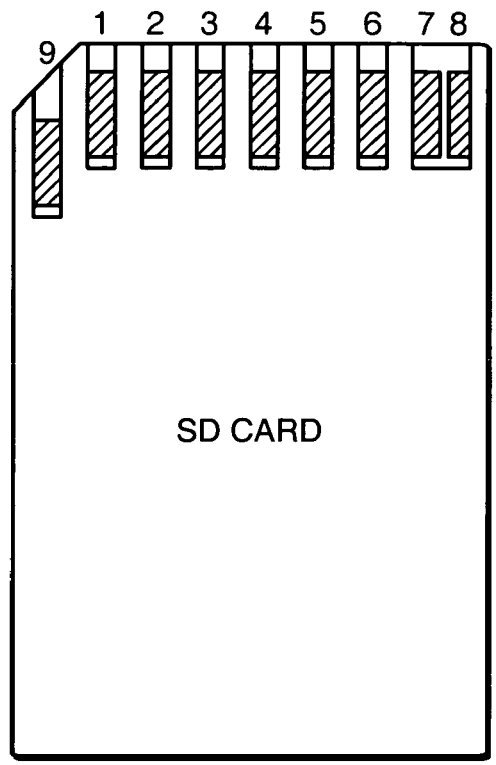
FIG._9
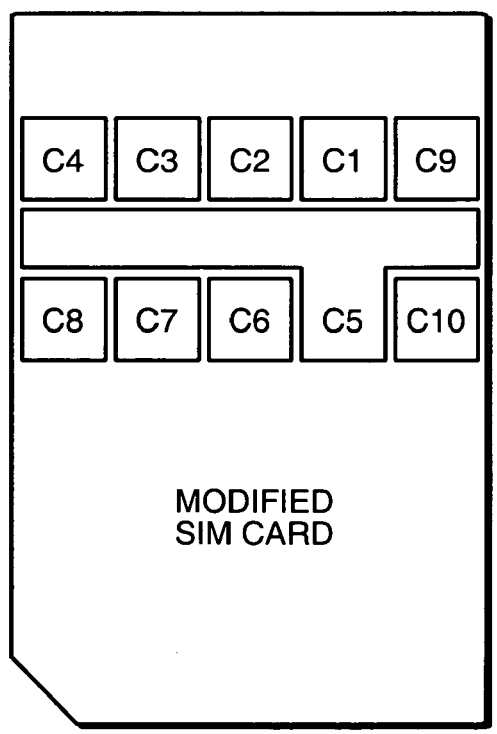
FIG._11

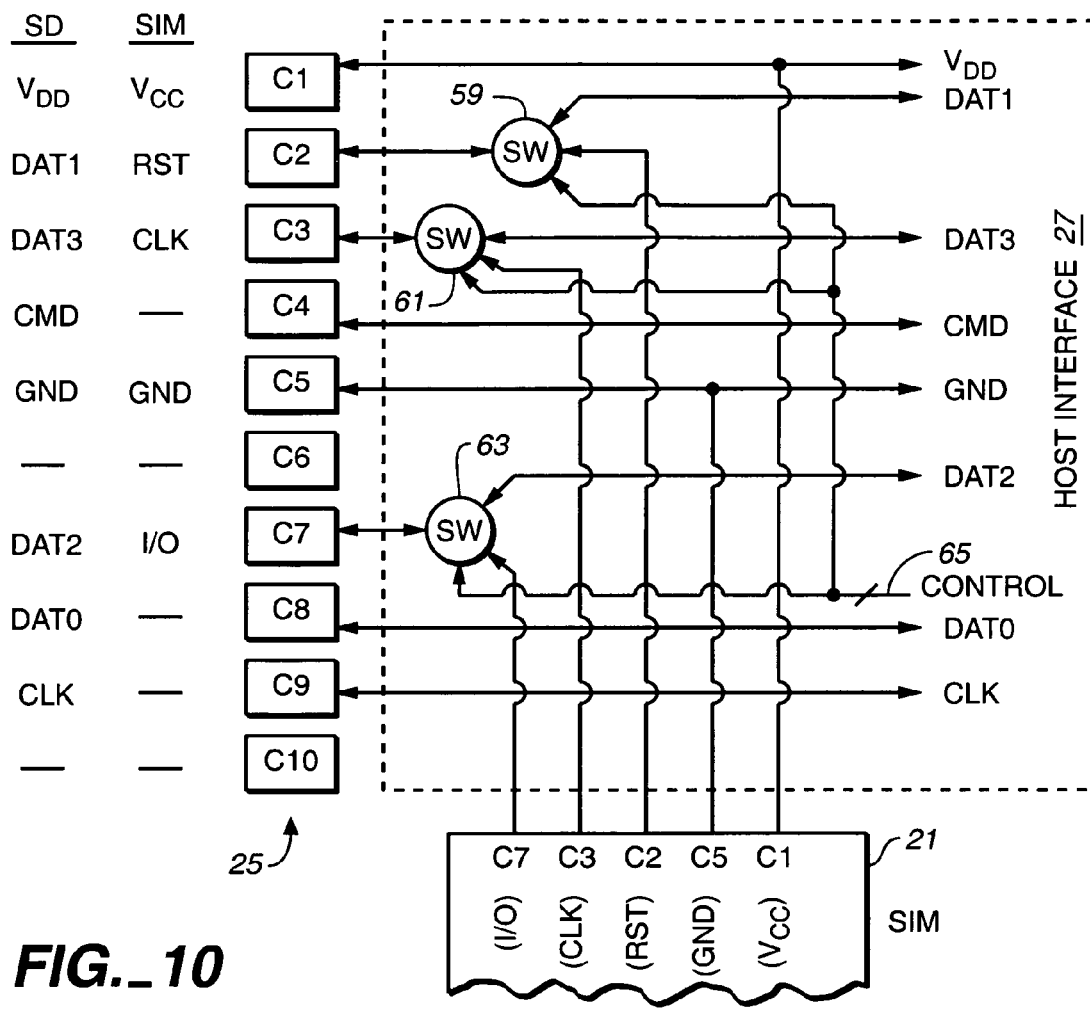
FIG._10

MEMORY CARDS INCLUDING A STANDARD SECURITY FUNCTION

FIELD OF THE INVENTION

This invention relates generally to the use and structure of removable electronic circuit cards having different mechanical and/or electrical interfaces.

BACKGROUND OF THE INVENTION

Electronic circuit cards, including non-volatile memory cards, have been commercially implemented according to a number of well-known standards. Memory cards are used with personal computers, cellular telephones, personal digital assistants, digital cameras, portable audio players and other host electronic devices for the storage of large amounts of data. Such cards usually contain a non-volatile semiconductor memory cell array along with a controller that controls operation of the memory cell array and interfaces with a host to which the card connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard.

One such standard, the PC Card Standard, provides specifications for three types of PC Cards. Originally released in 1990, the PC Card Standard now contemplates three forms of a rectangular card measuring 85.6 mm. by 54.0 mm., having thicknesses of 3.3 mm. (Type I), 5.0 mm. (Type II) and 10.5 mm. (Type III). An electrical connector, which engages pins of a slot in which the card is removably inserted, is provided along a narrow edge of the card. PC Card slots are included in current notebook personal computers, as well as in other host equipment, particularly portable devices. The PC Card Standard is a product of the Personal Computer Memory Card International Association (PCMCIA). The latest release of the PC Card Standard from the PCMCIA is dated February 1995, which standard is incorporated herein by this reference.

In 1994, SanDisk Corporation introduced the Compact-Flash™ card (CF™ card) that is functionally compatible with the PC Card but is much smaller. The CF™ card is rectangularly shaped with dimensions of 43 mm. by 36 mm. and a thickness of 3.3 mm., and has a female pin connector along one edge. The CF™ card is widely used with cameras for the storage of video data. A passive adapter card is available, in which the CF™ card fits, that then can be inserted into a PC Card slot of a host computer or other device. The controller within the CF™ card operates with the card's flash memory to provide an ATA interface at its connector. That is, a host with which a CF™ card is connected interfaces with the card as if it is a disk drive. Specifications for the card have been developed by the CompactFlash Association, a current version of these specifications being 1.4, which standard is incorporated herein by this reference.

The SmartMedia™ card is about one-third the size of a PC Card, having dimensions of 45.0 mm. by 37.0 mm. and is very thin at only 0.76 mm. thick. Contacts are provided in a defined pattern as areas on a surface of the card. Its specifications have been defined by the Solid State Floppy Disk Card (SSFDC) Forum, which began in 1996. It contains flash memory, particularly of the NAND type. The SmartMedia™ card is intended for use with portable electronic devices, particularly cameras and audio devices, for storing large amounts of data. A memory controller is included either in the host device or in an adapter card in another format such as one according to the PC Card standard. Physical and electrical specifications for the SmartMedia™ card have been issued by the SSFDC Forum, a current version of this standard being 1.0, which standard is incorporated herein by this reference.

Another non-volatile memory card is the MultiMediaCard (MMC™). The physical and electrical specifications for the MMC are given in "The MultiMediaCard System Specification" that is updated and published from time-to-time by the MultiMediaCard Association (MMCA). Version 3.1 of that Specification, dated June 2001, is expressly incorporated herein by this reference. MMC™ products having varying storage capacity up to 128 megabytes in a single card are currently available from SanDisk Corporation. The MMC™ card is rectangularly shaped with a size similar to that of a postage stamp. The card's dimensions are 32.0 mm. by 24.0 mm. and 1.4 mm. thick, with a row of electrical contacts on a surface of the card along a narrow edge that also contains a cut-off corner. These products are described in a "MultiMediaCard Product Manual," Revision 2, dated April 2000, published by SanDisk Corporation, which Manual is expressly incorporated herein by this reference. Certain aspects of the electrical operation of the MMC products are also described in U.S. Pat. No. 6,279,114 and in patent application Ser. No. 09/186,064, filed Nov. 4, 1998, both by applicants Thomas N. Toombs and Micky Holtzman, and assigned to SanDisk Corporation. The physical card structure and a method of manufacturing it are described in U.S. Pat. No. 6,040,622, assigned to SanDisk Corporation. This patent and patent application are expressly incorporated herein by this reference.

A modified version of the MMC™ card is the later Secure Digital (SD) card. The SD Card has the same rectangular size as the MMC card but with an increased thickness (2.1 mm.) in order to accommodate an additional memory chip when that is desired. A primary difference between these two cards is the inclusion in the SD card of security features for its use to store and copy protect proprietary data such as that of music. Another difference between them is that the SD Card includes additional data contacts in order to enable faster data transfer between the card and a host. The other contacts of the SD Card are the same as those of the MMC™ card in order that sockets designed to accept the SD Card can also be made to accept the MMC™ card. This is described in PCT published application no. WO 02/15020 of Yoram Cedar, Micky Holtzman and Yosi Pinto, published Feb. 21, 2002, which publication is incorporated herein by this reference. The electrical interface with the SD card is further made to be, for the most part, backward compatible with the MMC™ card, in order that few changes to the operation of the host need be made in order to accommodate both types of cards. In each, a memory controller includes a microprocessor that manages operation of the memory and performs some limited operations on data being written to or read from the memory. Specifications for the SD card are available to member companies from the SD Association (SDA).

Another type of memory card is the Subscriber Identity Module (SIM), the specifications of which are published by the European Telecommunications Standards Institute (ETSI). A portion of these specifications appear as GSM 11.11, a recent version being technical specification ETSI TS 100 977 V8.3.0 (2000–08), entitled "Digital Cellular Telecommunications System (Phase 2+); Specification of the Subscriber Identity Module-Mobile Equipment (SIM-ME)

Interface," (GSM 11.11 Version 8.3.0 Release 1999). This specification is hereby incorporated herein by this reference. Two types of SIM cards are specified: an ID-1 SIM and a Plug-in SIM. In practice, a primary component of each SIM card is a SIM integrated circuit chip.

The ID-1 SIM card has a format and layout according to the ISO/IEC 7810 and 7816 standards of the International Organization for Standardization (ISO) and the International Electrotechnical Commission (IEC). The ISO/IEC 7810 standard is entitled "Identification cards—Physical characteristics," second edition, August 1995. The ISO/IEC 7816 standard has the general title of "Identification cards-Integrated Circuit(s) Cards with Contacts," and consists of parts 1-10 that carry individual dates from 1994 through 2000. These standards, copies of which are available from the ISO/IEC in Geneva, Switzerland, are expressly incorporated herein by this reference. The ID-1 SIM card is generally the size of a credit card, having dimensions of 85.60 mm. by 53.98 mm., with rounder corners, and a thickness of 0.76 mm. Such a card may have only memory or may also include a microprocessor, the latter often being referred to as a "Smart Card." One application of a Smart Card is as a debit card where an initial credit balance is decreased every time it is used to purchase a product or a service.

The Plug-in SIM is a very small card, smaller than the MMC™ and SD cards. The GSM 11.11 specification referenced above calls for this card to be a rectangle 25 mm. by 15 mm., with one corner cut off for orientation, and with the same thickness as the ID-1 SIM card. A primary use of the Plug-in SIM card is in mobile telephones and other portable devices. In both types of cards including the SIM, eight electrical contacts (but with as few as five being used) are specified in the ISO/IEC 7816 standard to be arranged on a surface of the card for contact by a host receptacle.

One function of the SIM provides a level of security for the device in which it is used. In a mobile communications device such as a cellular telephone, the device is authenticated by the communications network sending a random number to the device that is processed by a given algorithm, and the result is sent back to the network. The network compares that result with one it calculates itself by use of the same algorithm. If the results match, communication by the device over the network is enabled. A subscriber authentication key is stored in the SIM for use in this and other security algorithms. The SIM can also operate to control and support various operations of the device in which it is removably installed.

For applications utilizing both a non-volatile memory card and a SIM card, the SIM integrated circuit chip is conveniently incorporated within the memory card. This is described in PCT published application no. WO 02/13021 of Robert Wallace, Wesley Brewer and Yosi Pinto, published Feb. 14, 2002, which publication is incorporated herein by this reference. A SIM chip within either a MMC or a SD card shares the memory card's external contacts for access by a host system with which the memory card is connected.

Sony Corporation has commercialized a non-volatile memory card, sold as the Memory Stick™, that has yet another set of specifications. Its shape is that of an elongated rectangle having electrical contacts on a surface adjacent one of its short sides. The electrical interface through these contacts with a host to which it is connected is unique. No microprocessor or other processing unit is included in the card but rather the host with which it is removably inserted provides the necessary intelligence.

As is apparent from the foregoing summary of the primary electronic card standards, there are many differences in their physical characteristics including size and shape, in the number, arrangement and structure of electrical contacts and in the electrical interface with a host system through those contacts when the card is inserted into the host card slot. Differences also exist in the amount of control and data processing that occur within the cards. Adaptors, both active and passive types, allow some degree of interchangeability of electronic cards among such host devices. U.S. Pat. No. 6,266,724 of Harari et al. describes uses of combinations of mother and daughter memory cards, which patent is incorporated herein in its entirety by this reference.

SUMMARY OF THE INVENTION

A single small card combines the functions of two or more of the card standards. The combination card has a physical arrangement according to either one of these two or more card standards, or, alternatively, according to yet another card standard. One of the functions included in the card is a significant amount of non-volatile memory and a memory controller of a first card standard. According to one specific feature of the present invention, the function of a second card standard operates to control access to that memory system and/or encrypt and decrypt data stored in the memory. According to another specific feature of the present invention, operations according to the second card standard are controlled by the memory controller of the first card standard. According to yet another specific feature of the present invention, protocol standards of both of the first and second card standards are separately implemented in one package having a physical shape according to either one of the first or second card standards, either sharing a common set of external package contacts or utilizing separate sets of contacts according to both of the first and second card standards. These features can be utilized alone or they can be used together in a single card.

In a specific example, the SIM function is combined with the non-volatile flash memory and its controller according to the MMC or SD card standards. The physical format of the combined card is made to be that of one of the Plug-in SIM, MMC™ or SD card. In one exemplary form, the Plug-in SIM card format is used with a few external electrical contacts being added to those of the Plug-in SIM standard as may be necessary for operation of the memory according to either of the MMC™ or the SD standards. In a second exemplary form, a SIM integrated circuit chip is included in a card with physical characteristics and contacts according to either of the MMC or SD card standards. In both examples, the SIM chip is connected with the memory controller in a manner to both be accessible by the host through the card contacts and to operate with the controller. A security code inputted to the card from the host can, for example, be verified on the SIM chip and the memory controller responsively enabled to operate the card's memory when the inputted security code matches that stored in the SIM chip. Use of the SIM function or chip, which provide security in a wide variety of applications, in conjunction with the memory allows improving security of the memory at a reasonable cost. The number of applications of existing memory cards described in the Background above, where improved security is important, is increased when a SIM circuit chip is added.

Additional aspects, features and advantages of the present invention are included in the following description of representative embodiments, which description should be taken in conjunction with the accompanying drawings.

BRIEF DESCRIPTION OF THE DRAWINGS

FIGS. 1A and 1B show one example, in respective physical and logical views, of the SIM function and non-volatile memory combined into a single card of one configuration and with separate sets of external contacts provided;

FIGS. 2A and 2B show another example, in respective physical and logical views, of the SIM function and non-volatile memory combined into a single card of a different configuration and with separate sets of external contacts provided;

FIG. 3 schematically illustrates a system including the combination of the SIM function and non-volatile memory in a single card with a single set of external contacts;

FIG. 4 is an electronic block diagram of the system of FIG. 3, showing details of its controller;

FIG. 5 is a circuit diagram of a portion of the system of FIG. 4 when implemented in a card having external contacts of a SD card;

FIGS. 6A, 6B and 6C illustrate three of the operational connections of. the switches of FIG. 5;

FIG. 7 illustrates a command data structure used with the card system illustrated in FIG. 4;

FIG. 8 is an operating flow chart of the card system of FIG. 4;

FIG. 9 shows an SD card in which the system of FIGS. 4 and 5 may be embodied;

FIG. 10 is a circuit diagram of a portion of the system of FIG. 4 when implemented in a card having external contacts of a Plug-in SIM card and additional contacts; and FIG. 11 shows a card according to the Plug-in SIM format with a modified set of contacts in which the system of FIGS. 4 and 10 may be embodied.

DESCRIPTION OF EXEMPLARY EMBODIMENTS

An example memory card 11 is illustrated in FIGS. 1A and 1B to have two sets 13 and 15 of electrical contacts on an outside surface that follow two different existing card standards. The contacts 13 are provided in a row along a short edge of the card that has a cut off corner, following either the MMC or SD card specifications referenced above. The MMC standard calls for seven contacts M1–M7. The SD standard uses those same seven contacts plus additional contacts S8 and S9. While the MMC specifications call for a single contact through which data is passed to and from a non-volatile memory within the card, the SD specifications use four data contacts for faster data transmission, as described above. In either case, the contacts 13 are connected with a memory controller 17 and flash EEPROM memory 19 within the card, according to either the MMC or SD standards. The controller 17 and memory 19 may be implemented on separate integrated circuit chips or combined on the same chip.

The set 15 of contacts, in this specific example, follow the ISO/IEC 7816 standard discussed above. The set 15 of contacts may be placed on the same side of the card 11 as the set 13 of contacts, or on the opposite side. The ISO/IEC 7816 standard contemplates the use of eight contacts C1–C8, although contacts C4 and C8 are not currently used. The remaining six contacts are connected with a SIM 21 within the card, according to the GSM 11.11 specification discussed above, which may be a separate integrated circuit chip that is commercially available. Of course, the SIM 21 may alternatively be combined on a single integrated circuit chip with either or both of the controller 17 and memory 19 but this is more complicated and expensive. It is contemplated that the card 11 has the physical size and other attributes of either of the MMC or SD cards, depending upon whether the contacts 13 follow the MMC or SD specifications, respectively.

The SIM 21 can operate as it is intended, namely to enable operation of the cellular telephone or other host device in which the card 11 is installed. This SIM function can operate independently of the memory 19 and its controller 17, wherein the SIM and memory functions are simply provided in the same card. However, the SIM 21 can also be connected with the memory controller 17, such as by lines 23, in order to enable access to the memory 19 at the same time that the host device in which the card 11 is placed has been enabled. This prevents access to the memory 19 except when the card 11 is inserted into the one host device, or number of devices, for which it has been configured to enable. Alternatively, the SIM 21 may be used to enable access to the memory 19 in any host device when the user provides the correct data signals, such as a password, to the SIM 21 through the contacts 15.

Another example card 12 is illustrated in FIGS. 2A and 2B to contain the same functional components as the card 11 (FIGS. 1A and 1B) but with a different form factor. Here, the card 12 conforms to the Plug-in SIM card standard, as does a set 14 of contacts. But to this is added a row of contacts 16 that communicate with the memory 19 through the controller 17. The contacts 16 are positioned along the narrow end of the card that contains a cut-off corner, and need not conform to a pattern of contacts of any existing card standard.

Instead of communicating with the memory controller and the SIM through separate sets of contacts, their operation may be integrated to an extent that allows use of a card with a single set 25 of contacts, as illustrated in FIG. 3. The format of the contacts 25 may be from one of the MMC, SD or Plug-in SIM card specifications, or modifications thereof, or according to some other published card standard. Other physical characteristics will usually be according to the same standard as the contacts, or at least primarily the same. In the embodiment of FIG. 3, communication with the SIM 21 is through the memory controller 17. The controller 17, in addition to controlling operation of the memory 19, is configured to recognize and pass SIM commands through to the SIM 21 without affecting operation of the memory 19. Memory commands received through the contacts 25 are handled in a normal manner to control the memory 19 without causing any effect upon the SIM 21. Similarly, the SIM 21 communicates directly with the controller 17 to provide access to the flash memory 19 or otherwise operate the memory 19.

FIG. 4 shows a more specific implementation of the system of FIG. 3 that uses a controller of the type found in the MMC and SD cards. The controller 17 includes a host interface 27 connected with the card contacts 25 and to the lines 23 of the SIM 21. Central to the controller 17 is a processor 29, in the form of a microprocessor or microcontroller. The processor 29 operates in a normal manner to control the memory 19 through a memory interface 31. The processor 29 also recognizes and passes commands and data associated with the SIM 21 between the card contacts 25 and the SIM 21, without any significant processing. A buffer memory 35 is used for temporarily storing data to be programmed into, or just having been read from, the memory 19. Random-access-memory 37 and read-only-memory 39 are typically also provided for use by the processor 29.

As an example, where the memory controller 17 and memory 19 meet either of the MMC or SD specifications, commands for the SIM 21 may be made to be application specific commands that are described in the MMC system specification (APP_CMD). When an application specific command is received by the controller 17, the processor 29 then examines the next command received from the host immediately thereafter for its instructions. That next command is, according to the MMC specifications, is executed as part of operating the memory 19. However, a command that follows the APP_CMD command may be a command that accesses the SIM 21 by using the ISO/IEC 7816 specifications. In this case, the processor 29 causes the command and any associated data packet to be sent to the SIM 21. No operation is performed on the memory in response to such an ISO/IEC 7816 command. The SIM 21 then receives and executes such a command according to the GSM 11.11 or other specification to which the SIM 21 conforms.

FIG. 5 illustrates an example wiring connection of a front-end of the host interface 27 when the signal protocols of the card contacts 25 (M1–M7, S8 and S9) are according to the SD standard. The lines from each of the contacts M2–M7 are routed directly to other components of the memory controller. The lines from the card contacts M1, S8 and S9, however, are connected with respective switching circuits 26, 28 and 30 that make connections in response to switching control signals in lines 32. Each of these switching circuits is provided with three possible connections, as shown individually in FIGS. 6A–6C, using switch 26 as an example. In FIG. 6A, the card contact S8 is connected with the DAT1 line to the memory controller, according to the SD card specification. In this state, data is passed between the S8 card contact to and from the flash memory 19 through the controller 17. But when the appropriate control signal exists in the lines 32, the line from the S8 contact is connected with contact C2 of the SIM 21, as shown in FIG. 6B, thereby allowing commands and data to be communicated between the card contact S8 and the SIM contact C2 (reset). The third position of the switching circuit 26, shown in FIG. 6C, connects the contact C2 of the SIM 21 directly with the line DAT1 of the memory system. This allows for direct communication between the SIM 21 and the memory controller 17 without involving a host to which the card is connected. Authorization for a host to access the flash memory 19, for example, may be provided by this direct connection after a password inputted from the host to the SIM 21 has been verified.

The other two switches 28 and 30 operate in the same manner but are connected to different lines. The switch 28 is connected with the card contact M1, the SIM contact C3 (clock) and the memory line DAT3. Similarly, the switch 30 is connected with the card contact S9, the SIM contact C7 (input/output) and the memory line DAT2. The switches 26, 28 and 30 can thus be seen to controllably connect three of the card pins to either the memory controller 17 and memory 19 or to three terminals of the SIM 21, or, as a third connection, to connect those three terminals of the SIM 21 with the controller and memory. The SIM power ($V_{CC}$) contact C1 and ground contact C5 are permanently connected with card contacts M4 and M3, respectively, that also supply power to the controller 17 and memory 19. The switching circuits 26, 28 and 30 may be implemented in a variety of ways including by use of a group of transistors, a set of bi-directional drivers, or a collection of logic gates to ensure that a logic signal is transferred between the various terminals as described herein.

The three shared contacts M1, S8 and S9 of the SD card are three data contacts added by the SD card specification to the single data contact of the MMC. This leaves the fourth data contact M7 that is useable by the controller 17 and memory 19 for data transfers at all times, even when the SIM 21 is connected to others of the card contacts or directly to the controller. Preferred physical characteristics (including external contacts) of a card implementing the circuits of FIG. 5 is the SD card, as shown in FIG. 9.

FIG. 7 illustrates an example command data structure and a flowchart of FIG. 8 outlines responses of the controller 17 to the receipt of a command. When an initial command 41 (FIG. 7) is received (block 47 of FIG. 8), the processor 29 determines whether it is such an application specific command (block 49). If it is not, the processor executes the command (block 51) as part of the normal operation of controlling the memory 19. If the initial command 41 does contain the MMC application specific command, the processing continues to determine (block 53) whether the next received command (43 of FIG. 7) relates to the SIM 21 or not. If it does not, the processor executes the command according to the MMC specification (block 55) in the operation of the memory 19. If the second command is an access to the SIM 21, the command and all other data associated with the command are directed (block 57) to the SIM 21. Whichever of the three paths 51, 55 or 57 are taken in response to decoding a received command, a final command 45 (FIG. 7) causes execution of the command to terminate.

An alternative way of accessing the SIM 21 is to use a special Application Specific command to enter the SIM operating mode. After such a command is accepted by the card, it will interpret any further commands as SIM related commands until the next Application Specific command is received.

Another example card that includes the SIM function with the MMC or SD memory characteristics is illustrated in FIGS. 10 and 11. FIG. 10 shows a circuit at the front end of the controller 17 (FIG. 4) that of the same type as that of FIG. 5 except that the single set of external card contacts 25 is a modified version of the SIM card, as shown in FIG. 11. The contacts C1–C8 are positioned on the face of the card according to the ISO/IEC 7816 specifications. Two additional contacts C9 and C10 have been added so that the single set of contacts can handle both the flash memory, through its controller, and the SIM functions. The remaining physical characteristics of the card of FIG. 11 follow the those of the SIM card except that it may be thicker in order to accommodate the additional memory and controller integrated circuit chips.

To do so, three of the external card contacts are switched between the memory controller and the SIM, in a manner similar to that described with respect to the example of FIGS. 5 and 9. Referring to FIG. 10, contacts C1–C5 and C7–C9 of the card of FIG. 11 are either connected directly through to the memory controller or through switching circuits 59, 61 and 63 to either the memory controller or the SIM 21 in response to a control signal on lines 65. These switching circuits are connected and operate in the same manner as described above with respect to FIGS. 6A–6C. Contacts C2, C3 and C7 are shared in this way. These switches also allow connection of the SIM 21 directly to the memory controller 17, as described above. The controller 17, the memory 19 and the SIM 21 all receive power from common contacts C1 and C5. This card is preferably operated in the same manner as described above with respect to FIGS. 7 and 8.

Although specific examples of the present invention have been described, it will be understood that the invention is entitled to protection within the full scope of the appended claims.

It is claimed:

1. A memory card, comprising:
   a non-volatile re-writable data memory,
   a controller connected to control operation of the memory,
   a plurality of electrical contacts on an outside surface of the card that are connected with the memory controller, and
   a SIM function connected with the memory controller in a manner to be accessible through the outside contacts and to be able to communicate directly with the memory controller, wherein the SIM function is connected with the memory controller in a manner to permit operation of the data memory in response to a proper security code being received by the SIM function through the outside contacts.

2. The memory card of claim 1, wherein the SIM function is accessible from the outside contacts through the memory controller.

3. The memory card of claim 2, wherein the memory controller directs commands and data received through the outside contacts to either the SIM function or the data memory according to a structure of the commands.

4. The memory card of claim 1, wherein the SIM function is provided on an integrated circuit chip separate from the controller and data memory.

5. The memory card of claim 1, wherein the controller includes a microprocessor.

6. The memory card of claim 1, wherein the memory card has physical dimensions according to a Plug-in SIM card standard.

7. The memory card of claim 6, wherein the memory card includes external contacts according to the Plug-in SIM card standard plus at least two additional contacts adjacent those according to the Plug-in SIM card standard.

8. The memory card of claim 1, wherein the memory card has physical dimensions and external contacts according to an SD card standard.

9. The memory card of claim 1, wherein the memory card has physical dimensions and external contacts according to a Memory Stick standard.

10. The memory card of claim 1, wherein the controller and SIM function are connected to common ones of said plurality of electrical contacts.

11. The memory card of claim 1, wherein the controller and SIM function are connected to different sets of said plurality of electrical contacts that are spatially separated on a surface of the card.

12. A memory system card, comprising one or more integrated circuit chips providing a non-volatile memory, a controller of said memory and a separate security function, said integrated circuit chips being enclosed in a card with the memory controller electrically connected with conductive contacts provided on an outside of the card, the security function being connected with the memory controller in a manner to enable access to the non-volatile memory from the outside contacts through the memory controller in response to proper security data being supplied to the security function through the outside contacts and memory controller.

13. A memory system, comprising:
    a re-writable non-volatile memory encased in a card and including a first plurality of lines connected with an external set of electrical contacts according to a first published card standard,
    an added function encased within the card and having a second plurality of lines, and
    a switching circuit encased within the card and connected with at least some of the first and second plurality of lines to make any one of the following three connections in response to a command received through the external set of electrical contacts, (1) connect said at least some of the first plurality of lines to specified ones of the card external contacts while maintaining the second plurality of lines disconnected therefrom, or (2) connect said at least some of the second plurality of lines to said specified ones of the card external contacts while maintaining the first plurality of lines disconnected therefrom, or (3) connect said at least some of the first and second plurality of lines together without either being connected to said specified ones of the card external contacts.

14. The memory system of claim 13, wherein the added function is a SIM function provided on an additional integrated circuit chip separate from one or more integrated circuit chips forming the re-writable non-volatile memory, and the second plurality of lines are connectable with the external set of electrical contacts according to a second published card standard that is a Plug-in SIM standard.

15. The memory system of claim 14, wherein the first published card standard is selected from a group of card standards consisting of SD, MMC or Memory Stick card standards.

16. The memory system of claim 15, wherein said specified ones of the card external contacts include those designated by the SD card standard as data contacts.

17. The memory system of claim 16, wherein said specified ones of the card external contacts are exactly DAT1, DAT2 and DAT3 of the SD card standard.

18. The memory system of claim 17, wherein said at least some of the second plurality of lines includes input/output, reset and clock functions of the SIM integrated circuit chip.

19. The memory system of claim 18, wherein the first published card standard is a Plug-in card standard.

20. The memory system of claim 19, wherein said specified ones of the card external contacts are exactly C2, C3 and C7 of the Plug-in card standard.

21. The memory system of claim 13, wherein the added function is normally provided within a card having the second plurality of lines connected with an external set of electrical contacts according to a second published card standard different from the first published card standard.

22. A method of operating an electronic card including a non-volatile memory, a memory controller and a SIM feature within the electronic card that also has one set of external electrical contacts, comprising:
    in response to receiving a command through said set of contacts for the electronic card to perform a specific function, the memory controller determines from the received command whether it is of a type for operating the non-volatile memory or is for use by the SIM feature,
    if the received command is determined to be for operating the non-volatile memory, carrying out the command with respect to the non-volatile memory without affecting the SIM feature, and
    if the received command is determined to be for the SIM feature, directing the command to the SIM feature without affecting operation of the non-volatile memory.

* * * * *